(12) United States Patent
Van Veen et al.

(10) Patent No.: US 11,902,720 B2
(45) Date of Patent: Feb. 13, 2024

(54) METHOD AND APPARATUS FOR DOWNSTREAM TIMESLOT SCHEDULING IN MULTI-RATE PASSIVE OPTICAL NETWORKS

(71) Applicant: Nokia Solutions and Networks Oy, Espoo (FI)

(72) Inventors: Doutje Van Veen, New Providence, NJ (US); Amitkumar Mahadevan, Edison, NJ (US); Vincent Houtsma, New Providence, NJ (US)

( * ) Notice: Subject to any disclaimer, the term of this patent is extended or adjusted under 35 U.S.C. 154(b) by 44 days.

(21) Appl. No.: 17/683,870

(22) Filed: Mar. 1, 2022

(65) Prior Publication Data

US 2023/0283933 A1    Sep. 7, 2023

(51) Int. Cl.
*H04Q 11/00*  (2006.01)
*H04B 10/27*  (2013.01)
*H04J 3/16*   (2006.01)

(52) U.S. Cl.
CPC ......... *H04Q 11/0062* (2013.01); *H04B 10/27* (2013.01); *H04J 3/16* (2013.01); *H04Q 2011/0064* (2013.01)

(58) Field of Classification Search
CPC .................................................. H04Q 11/0062
See application file for complete search history.

(56) References Cited

U.S. PATENT DOCUMENTS

2008/0056721 A1   3/2008  Mori
2009/0226182 A1*  9/2009  Adamiecki ........... H04L 25/062
                                                  398/140
2020/0344534 A1* 10/2020  Luo .................... H04Q 11/0067
2021/0050939 A1*  2/2021  Wey ....................... H04Q 11/00
2022/0224429 A1   7/2022  Li et al.

FOREIGN PATENT DOCUMENTS

EP         4 030 649          7/2022

OTHER PUBLICATIONS

50-Gigabit-capable passive optical networks (50G-PON): Physical media dependent (PMD) layer specification, SERIES G: Transmission Systems and Media, Digital Systems and Networks, Recommendation ITU TG.9804.3, Sep. 2021.

(Continued)

*Primary Examiner* — Shi K Li
(74) *Attorney, Agent, or Firm* — Capitol Patent + Trademark Law Firm, PLLC

(57) ABSTRACT

An optical line terminal (OLT) operating within a multi-rate PON is configured to perform downstream timeslot scheduling among an associated number of ONUs so as to minimize the change in information rate from one scheduled ONU timeslot to the next. In this manner, the clock recovery component at each ONU is best able to follow the change in information rates, remaining locked on the system clock regardless of the specific implementation of the clock and data recovery (CDR) functionality at a given ONU. The OLT may schedule timeslot assignments that span a pair of adjacent parts (referred to as a two-part cycle), with the first part having timeslots assigned from the lowest information rate (e.g., NRZ) to the highest (e.g., PAM4) and the second part's timeslots assigned in the reverse order; that is, from the highest to the lowest information rate.

16 Claims, 7 Drawing Sheets

(56) References Cited

OTHER PUBLICATIONS

World's First Field Trial of 100 Gbit/s Flexible PON (FLCS-PON), Borkowski et al., IEEE, 2020.
50Gb/s TDM PON Digital Signal Processing Challenges:Mining current G-PON Field Data to Assist Higher Speed PON Simon et al., IEEE, 2020.
Unified Evolution-Ready 25 Gbps NG-PON Architecture, Houtsma et al., ECOC 2016 42nd European Conference and Exhibition on Optical Communications Sep. 18-22, 2016 Düsseldorf.
DSP for 50G/100G Hybrid Modulated TDM-PON, Kaneda et al., IEEE, 2020.
Proceedings of the IEEE, pp. 1314-1316, Jul. 1969.
40-Gigabit-capable passive optical networks 2 (NG PON2): Physical media dependent (PMD) layer specification, Series G: Transmission Systems and Media, Digital Systems and Networks Digital sections and digital line system—Optical line systems for local and access networks, ITU-TG.989.2Telecommunication Standardization Sector of ITU, Feb. 2019.
Study of bandwidth enhancement and nonlinear behavior in avalanche photodiodes under high power condition J. Appl. Phys. 113, 044509 (2013); https://doi.org/10.1063/1.4788694 Submitted: Dec. 5, 2012 • Accepted: Jan. 4, 2013 • Published Online: Jan. 24, 2013 Wenlu Sun, Yang Fu, Zhiwen Lu, et al.
Flexible Upstream FEC for Higher Throughput, Efficiency, and Robustness for 50G PON, Mahadevan et al, OFC 2022 © Optica Publishing Group 2022.

* cited by examiner

METHOD AND APPARATUS FOR DOWNSTREAM TIMESLOT SCHEDULING IN MULTI-RATE PASSIVE OPTICAL NETWORKS

TECHNICAL FIELD

Disclosed herein are various embodiments of a passive optical network (PON) supporting multiple modulation formats in a broadcast downstream transmission.

BACKGROUND OF THE INVENTION

A passive optical network (PON) typically has a point-to-multipoint (P2MP) architecture in which passive optical splitters are used to enable a single optical transmitter to broadcast data transmissions to multiple subscribers. An exemplary PON includes an optical line terminal (OLT) at a service provider's network location and a plurality of optical network units (ONUs) near or at the end-user locations. The ONUs are connected to the OLT by way of an optical distribution network (ODN) that comprises one or more passive optical splitters. Downstream signals are typically broadcast to all ONUs, with upstream signals from the individual ONUs controlled using some type of multiple-access protocol.

In the past, time-division multiplexing (TDM) PON systems have been designed to meet the worst-case conditions that may exist at any given ONU (particularly in terms of attenuation along extended path lengths through the ODN and chromatic dispersion imparted by the type(s) of fibers within the network). However, the recently promulgated international standard ITU-T G.9804 for TDM PON, which allows for 50 Gb/s transmission rates in the downstream direction, explicitly assumes for the first time the use of some type of equalization and/or compensation equipment within the end-user's ONU.

Future TDM PON systems are expected to take advantage of the channel and operating condition improvements instituted by various ONUs to provide higher throughput to those customers who undertake the effort to improve the performance of their ONUs with respect to receiver sensitivity, providing high-speed data transmissions (for example, 50 Gb/s) to these customers.

It can be presumed, however, that various customers will continue to use legacy ONU equipment that is configured to support only the conventional continuous NRZ modulation format. Rather than restructuring the topology of the PON architecture to accommodate the different information rates, it has been proposed to employ a "flexible" PON framework; that is, a multi-rate PON system that uses various types of modulation schemes in the downstream direction.

A remaining challenge with a flexible (i.e., multi-rate) PON is the reduced performance of the clock recovery portion of legacy ONUs, since these elements will need to recover the clock signal from the higher-rate transmissions (destined for advanced ONUs) in order to remain locked on the system clock. The need to maintain the system clock is important not only for the proper recovery of the downstream data, but also for ensuring the proper timing for the burst-mode upstream transmission from the ONUs back to the OLT.

SUMMARY OF THE INVENTION

The needs remaining in the art are addressed by the present invention, which relates to a time-division multiplexed (TDM) passive optical network (PON) that is capable of supporting multiple downstream information rates (referred to at times hereinafter as a "multi-rate PON") with minimal disruption in clock recovery performance at the receiving optical network units (ONUs), regardless of the specific type of clock recovery circuitry employed at the ONU.

In accordance with the principles of the present invention, an optical line terminal (OLT) operating within a multi-rate PON is configured to perform downstream timeslot scheduling among an associated number of ONUs so as to minimize the change in information rate from one scheduled ONU timeslot to the next (for example, ordering the timeslot assignments from those ONUs operating at the lowest information rate to those ONUs operating at the highest information rate). In this manner, the clock recovery component at each ONU is best able to follow the change in information rates, remaining locked on the system clock regardless of the specific implementation of the clock and data recovery (CDR) functionality at a given ONU.

In preferred embodiments, the OLT schedules timeslot assignments that span a pair of adjacent parts (referred to as a two-part cycle), with the first part having timeslots assigned from the lowest information rate (e.g., NRZ) to the highest (e.g., PAM4 with specialized FEC/probabilistic constellation), and the second part's timeslots assigned in the reverse order; that is, from the highest to the lowest information rate. The OLT may schedule this two-part cycle to span an adjacent pair of PON frames, or may condense the timeslot assignment into a single frame, or utilize any time scale suitable for a given application (ranging from fractions of a single frame to a multiple number of frames).

It is an aspect of the present invention that by intentionally minimizing the change in information rate from one timeslot to the next, the clock and data recovery (CDR) circuitry within all of the ONUs (regardless of type of CDR) is able to quickly synchronize to the changing information rate.

Embodiments of the present invention may further incorporate additional signaling features (presence or absence of probabilistic constellation shaping, geometric shaping (or other types of appropriate shaping), difference complexities of FEC codes, and the like) to "smooth" the transition between adjacent timeslots.

An exemplary embodiment of the present invention may take the form of a method for scheduling user blocks in a downstream data transmission to a plurality of ONUs in a multi-rate time-division-multiplexed (TDM) PON, wherein the method includes the steps of: (1) identifying a downstream information rate used by each ONU in the plurality of ONUs; and (2) scheduling timeslots for user blocks based on the identified information rates in a manner that minimizes a transition in information rate between adjacent user blocks.

Another embodiment of the present invention may take the form of an apparatus comprising at least one processor and at least one memory (including computer program code). The memory is used at least to store, in a paired relationship, an identification of a specific optical network unit (ONU) and its associated downstream information rate for a plurality of ONUs. A configured combination of the at least one processor and at least one memory cause the apparatus to at least perform scheduling of user blocks in a downstream data transmission to the plurality of ONUs in a multi-rate time-division-multiplexed (TDM) passive optical network (PON) such that the user blocks are scheduled based on the stored information rates in a manner that minimizes a transition in information rate between adjacent user blocks in the downstream data transmission.

Other and further embodiments and aspects of the present invention will become apparent during the course of the following discussion and by reference to the accompanying drawings.

BRIEF DESCRIPTION OF THE DRAWINGS

Referring now to the drawings, where like numerals represent like elements in different views.

DETAILED DESCRIPTION

Figure 1:
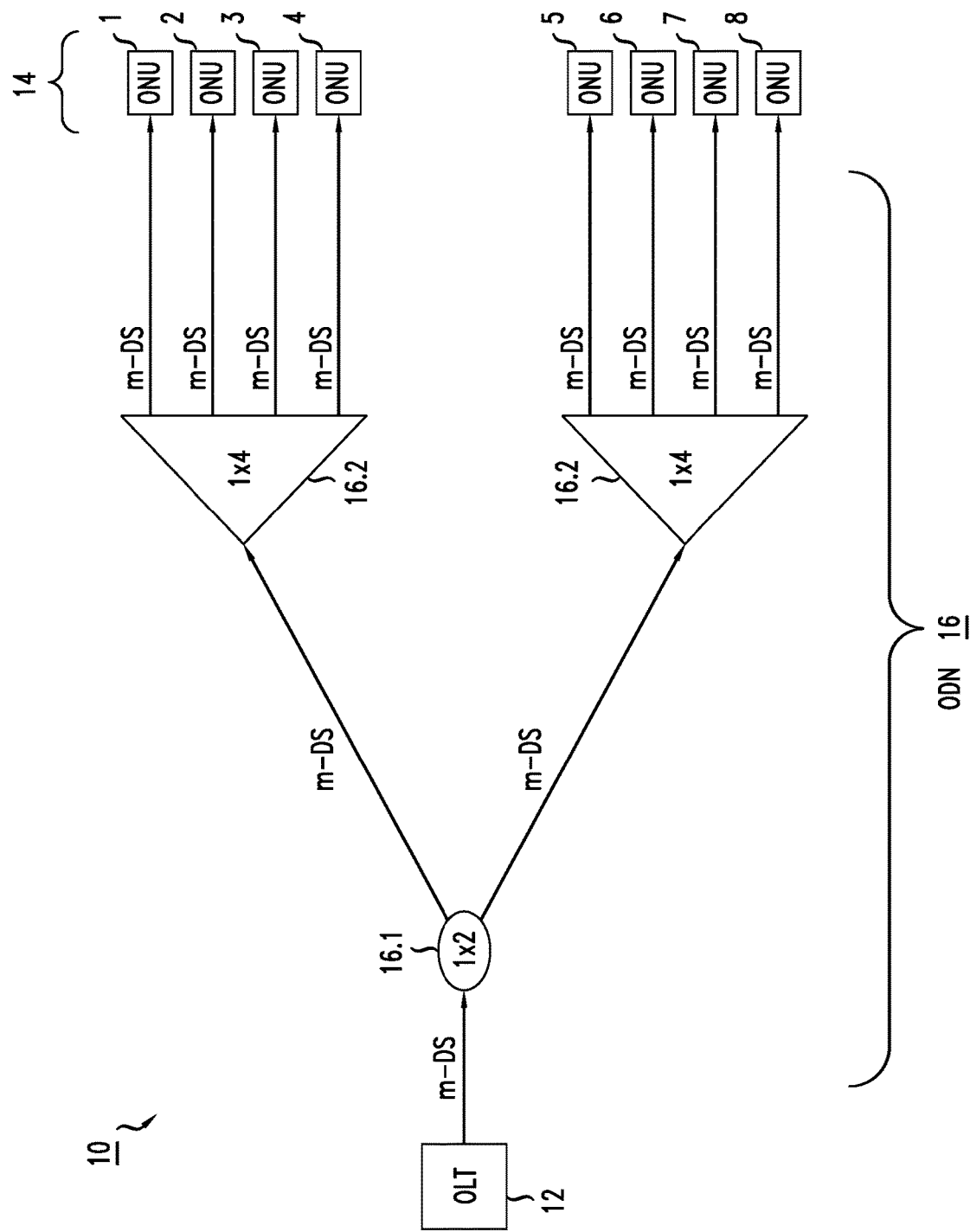
FIG. 1 illustrates an exemplary PON architecture that may support the use of multiple information rate downstream data from the OLT to the ONUs.

FIG. 1 is a schematic block diagram of a multi-rate passive optical network (PON) 10 useful in understanding the application of rate-based ordering of user blocks in TDM downstream broadcast transmission, in accordance with the principles of the present invention. FIG. 1 illustrates a conventional topology comprising an optical line terminal (OLT) 12 that communicates with a plurality of optical network units (ONUs) 14 via an optical distribution network (ODN) 16. The specific number of ONUs associated with a given OLT may be a function of the particular application (for example, a last-mile application of FTTx may serve a relatively small number of ONUs, while a mid-span link in a radio network may need to support hundreds of ONUs).

ODN 16 can be thought of as a data distribution system that comprises optical fiber cables, couplers, splitters, and other suitable passive components. ODN 16 extends from OLT 12 to ONUs 14 in a branching configuration, such as shown in FIG. 1. Here, a two-level branching arrangement is shown merely as one example, including a 1×2 splitter 16.1 at a first splitting level and a pair of 1×4 splitters 16.2 at a second splitting level. in general, ODN 16 may be configured in any other suitable point-to-multipoint (P2MP) manner for TDM PON systems.

In operation of multi-rate PON 10, OLT 12 is configured to broadcast a single downstream multi-rate data transmission (illustrated as m-DS in FIG. 1) to all of the ONUs 14, where each individual ONU $14_i$ is configured to extract its unique "user block" of data from each received PON frame, discarding the remainder of the blocks. In this multi-rate environment, each downstream PON frame supports the transmission of data operating at different information rates, with the individual user blocks operating at the particular information rate utilized by its ONU. The various information rates may include different base modulation rates (e.g., NRZ, PAM3, PAM4), as well as difference in coding schemes, such as the presence or absence of probabilistic constellation shaping, different FEC codes, or the like.

Figure 2:
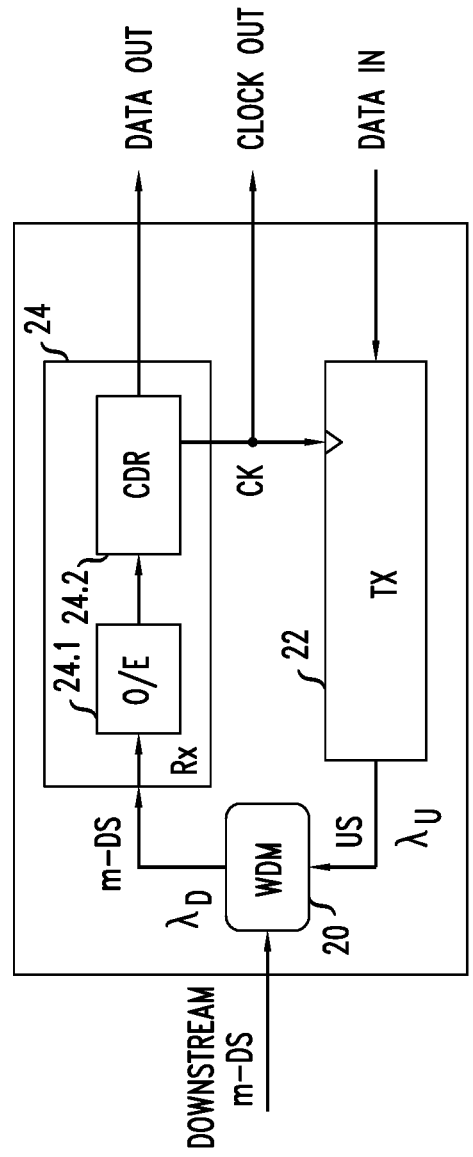
FIG. 2 is a diagram of a typical ONU.

FIG. 2 is a simplified block diagram of a typical ONU 14, which includes an wavelength division multiplexer (WDM) 20 or other suitable directional optical coupler, an optical transmitter 22, and an optical receiver 24. WDM 20 is configured to (i) direct downstream signal m-DS received from OLT 12 (and operating at the downstream wavelength $\lambda_D$) to optical receiver 24 and (ii) direct upstream signals (designated US and operating at a different wavelength $\lambda_U$) from optical transmitter 22 toward OLT 12. Optical receiver component 24 is configured to recover the data destined for that particular ONU 14 from the broadcast downstream signal m-DS. Thus, an exemplary receiver component $24i$ within ONU $14i$ is designed to operate at its associated information rate. While there are many different component designs for an optical receiver used in this manner, they all utilize some type of optical-to-electrical (O/E) conversion element 24.1 (e.g., a photodetecting device) and a clock and data recovery (CDR) element 24.2. CDR 24.2 takes the electrical output from O/E element 24.1 and recovers the transmitted clock and then uses this clock to properly sample the received signal and form the output digital data signal. This same recovered clock may be used, as shown, as a clock input to transmitter 22 of ONU 14.

As mentioned above, one of the challenges of multi-rate PON is the reduced CDR performance of legacy fixed-rate (i.e., low information rate) continuous mode NRZ ONU receivers when attempting to recover the transmitted clock from high information rate user blocks. These low information rate receivers still need to maintain synchronization with each block within downstream signal m-DS, even when higher information rate user blocks (contained within the PON frame but destined for other, "advanced" ONUs) are being received. The extraction of a proper clock signal from a received signal whose information rate randomly varies (as a function of the rate employed by the different ONUs) can be extremely challenging. The reduction in performance exhibited by legacy ONUs results in an optical power penalty in the downstream direction. Additionally, maintaining synchronization to the transmitter clock is also critical for upstream performance, since the downstream clock recovered at the ONU is re-used to clock the upstream burst transmission from the ONU back to the OLT.

Embodiments of the present invention as disclosed herein enable the provision of multi-rate PON in a manner that is able to accommodate all end-users, addressing the clock recovery issues associated with legacy ONUs by intentionally ordering the timeslots in the downstream transmission as a function of information rate (e.g., from lowest to highest) to ensure that the change in rate at each transition is relatively small and can be locked on by the CDR circuitry within legacy ONU modules. In this manner, a multi-rate PON is able to provide optimum service, based on the highest supported information rates, to those ONUs 14 that include advanced receiver arrangements, while still providing service to the legacy ONUs using lower-speed CDR circuitry.

For illustrative purposes and without any implied limitations, exemplary information rates as described below may include different base modulation schemes, such as NRZ modulation (as now used with legacy devices) and various higher-level forms of pulse-amplitude modulation (PAM), as well as duobinary or other types of polybinary modulation. Beyond differences in base modulation, different information rates may be designed by incorporating other factors with the base modulation. For example, including probabilistic constellation shaping of a given base modulation results in a different information rate, as does the use of different FEC codes. Moreover, it is contemplated that differences in information may be intentionally introduced to minimize transitions between rates.

Figure 3:
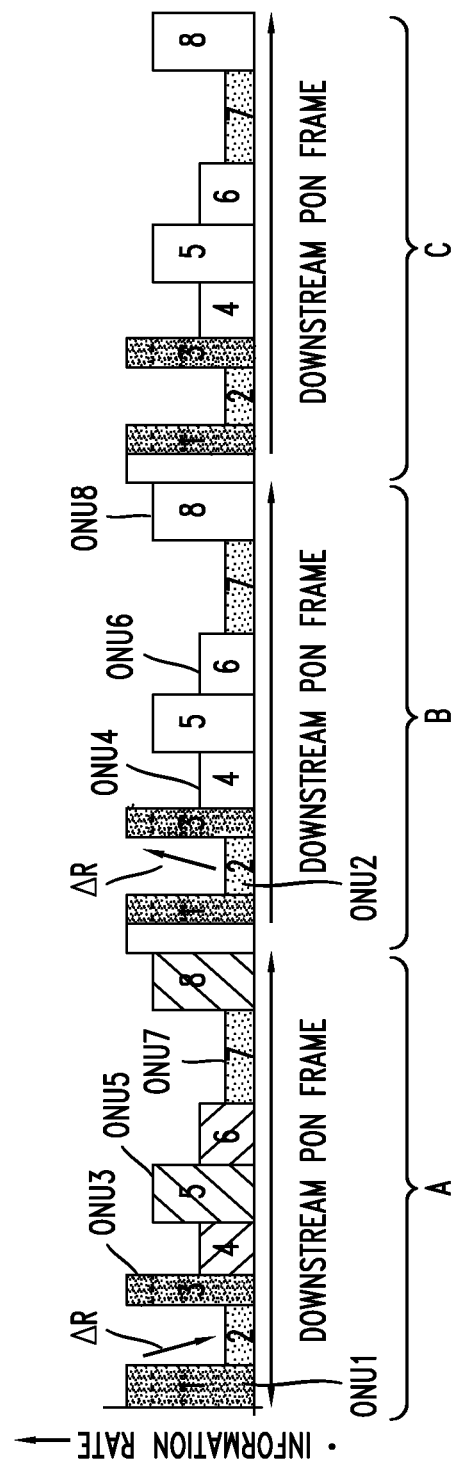
FIG. 3 depicts a conventional prior art timeslot assignment for supporting multi-rate downstream transmission in a TDM PON system.

FIG. 3 is a timing diagram of three successive multi-rate PON downstream frames A, B, and C of the prior art, illustrating the problems introduced by using different information rates in a multi-rate PON architecture. For illustrative purposes, a set of eight separate ONUs is identified as receiving a downstream signal from the OLT (paralleling the depiction of FIG. 1). In the TDM PON architecture, each ONU receives its own downstream data in a pre-assigned timeslot within the PON frame, and in this example maintaining the same timeslot assignment from one frame to the next. For ease of explanation, the timeslot assignments shown in FIG. 3 are paired with a set of ONUs 1-8 in a one-to-one manner. It is evident from the diagram of FIG. 3 that there are four different information rates (modulation schemes) present in this example. Additionally, various ones of the ONUs are shown here as allotted a longer duration timeslot than others.

In evaluating the set of PON frames as shown in FIG. 3, it is clear that ONUs 1 and 3 operate at the highest information rate, ONUs 2 and 7 at the lowest information rate (e.g., legacy CDR components), and the others at rates between these two extremes. Most problematic for a legacy ONU in this example is the transition between timeslots 1, 2, and 3, which exhibits the largest rate change $\Delta R$, which may be difference between NRZ and PAM4 modulation, for example.

Figure 4:
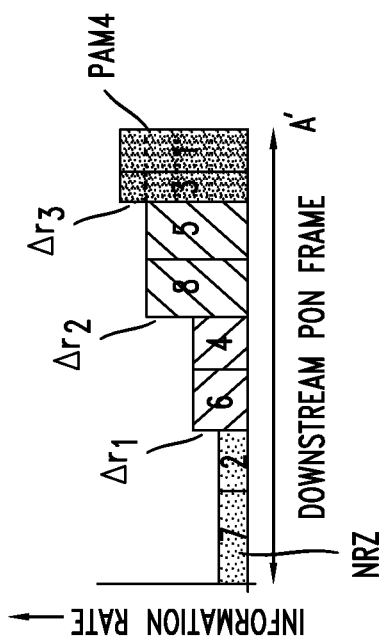
FIG. 4 illustrates an "information rate"-based timeslot assignment performed by an OLT in accordance with the principles of the present invention, minimizing transitions in information rates between adjacent user blocks.

In accordance with the principles of the present invention, therefore, it is proposed to intentionally order the timeslot assignments in an "information rate"-based sequence to minimize the transition in information rate (if any) from one user block of data to the next; for example, order the user blocks from the lowest information rate to the highest. FIG. 4 illustrates this principle in an exemplary PON frame A', which transmits the same eight user blocks as frame A in FIG. 3, but in this case, orders the blocks such that the transitions between different information rates is minimized. The transitions are shown here as $\Delta r_1$, $\Delta r_2$, and $\Delta r_3$, which are all less than the $\Delta R$ transition between the data blocks destined for ONU 1 and ONU 2, as shown in FIG. 3. By minimizing the possibility of requiring a significant rate change transition from one block to the next, legacy CDR/receiver equipment at a given ONU remains capable of locking onto the information rates as they progresses from one user block to the next. Thus, in contrast to prior art TDM PON arrangements where the downstream broadcast may simply employ a "round-robin" schedule (e.g., ONU1, ONU2, ONU3, . . . ) or even an arbitrary schedule, an OLT 12 performing timeslot scheduling in accordance with the present invention uses a rate-based approach that minimizes the transition in information rate from one user block to the next.

Figure 5:
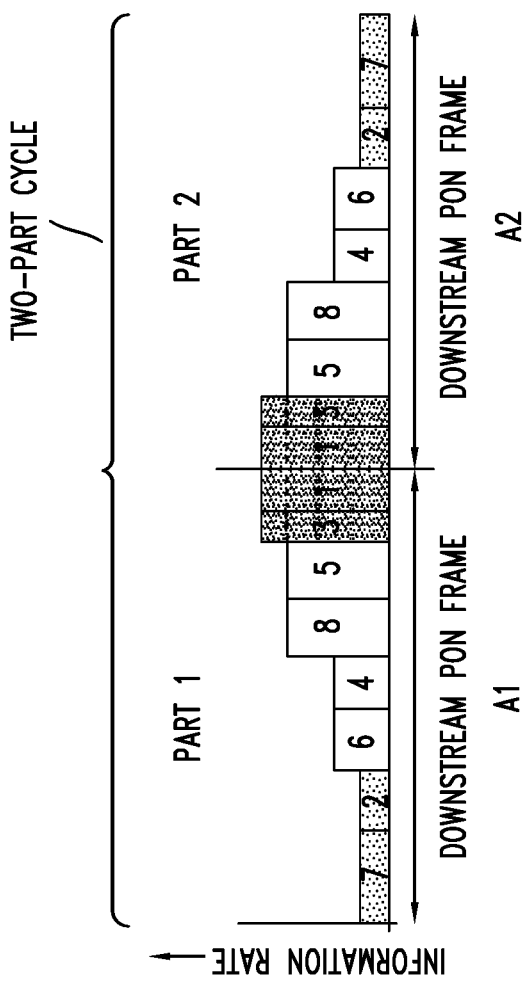
FIG. 5 depicts an exemplary two-part cycle of timeslot assignment in accordance with the principles of the present invention, allowing for minimal transitions to continue from one PON frame to the next.
Figure 6:
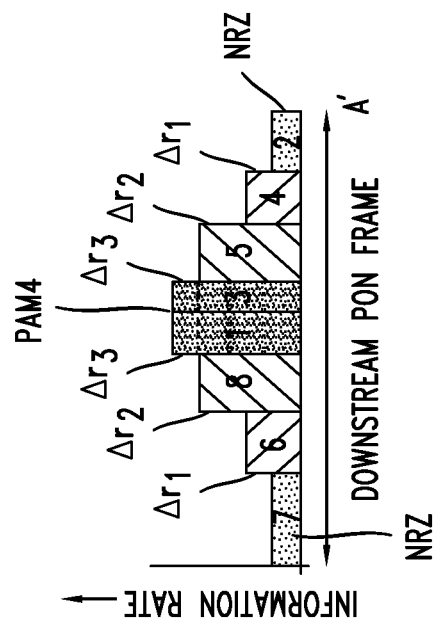
FIG. 6 illustrates an alternative to the timeslot scheduling of FIG. 5, where in this case the time-part cycle is condensed within a single PON frame.

As mentioned above, a preferred embodiment of the present invention performs the timeslot assignment scheduling to progress through a complete two-part cycle from lowest information rate to highest information and back to the lowest information rate, as opposed to re-setting the ordering to begin with the lowest rate (for example) at the onset of each PON frame. An exemplary configuration of this embodiment is shown in FIG. 5, which depicts an exemplary a two-part cycle that optimizes the transition between information rates in both directions (e.g., from lowest to highest and then back to lowest, or vice versa). In the particular illustration of FIG. 5, each "part" of the cycle comprises a complete PON frame. Thus, the timeslot scheduling as performed by the OLT would span a pair of adjacent PON frames to provide rate-based timeslot assignments in accordance with the principles of the present invention. For example, OLT 12 schedules the timeslot assignments for PON frames A1 and A2 as a single unit, allowing for the rate transitions to go through a complete cycle from "low" to "high" and back down to "low". The pairing of frames eliminates the need for a guard band (to allow for all ONU receivers to reset) and maintains the same gradual transition in information rates. Alternatively, it is possible to provide the same full cycle of rates within a single frame, shown as PON frame A3 in FIG. 6. While also a useful embodiment of the inventive principles, the number of clock rate changes per frame is twice that required in the two-frame embodiment shown in FIG. 5.

Figure 7:
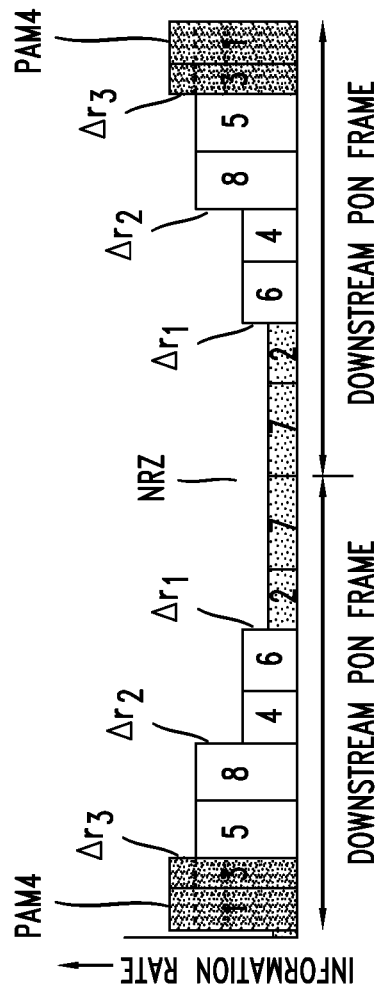
FIG. 7 depicts an alternative timeslot assignment scheduling of the present invention, in this case using a "high-low-high" ordering of information rates.

It is to be understood that the information rate-based scheduling may also be performed to order the rates from highest to lowest, and then back to highest. FIG. 7 illustrates this order, in this case spanning a pair of adjacent PON frames. Moreover, while the illustrated examples of rate-based scheduling shown in FIGS. 4-7 utilize either a single PON frame or a pair of adjacent PON frames, the rate-based scheduling approach may schedule user blocks to minimize rate-based transitions along time scales other than a single frame or pair of frames. Indeed, the schedule process may be utilized within a fraction of a single frame or extended to span across a larger number of adjacent frames. Various factors and specific application requirements may be taken into consideration when determining a proper timescale to employ including, but not limited to, the number of individual ONUs being served in the PON, the number of different information rates being supported, loss budget, reach, and the like.

Figure 8:
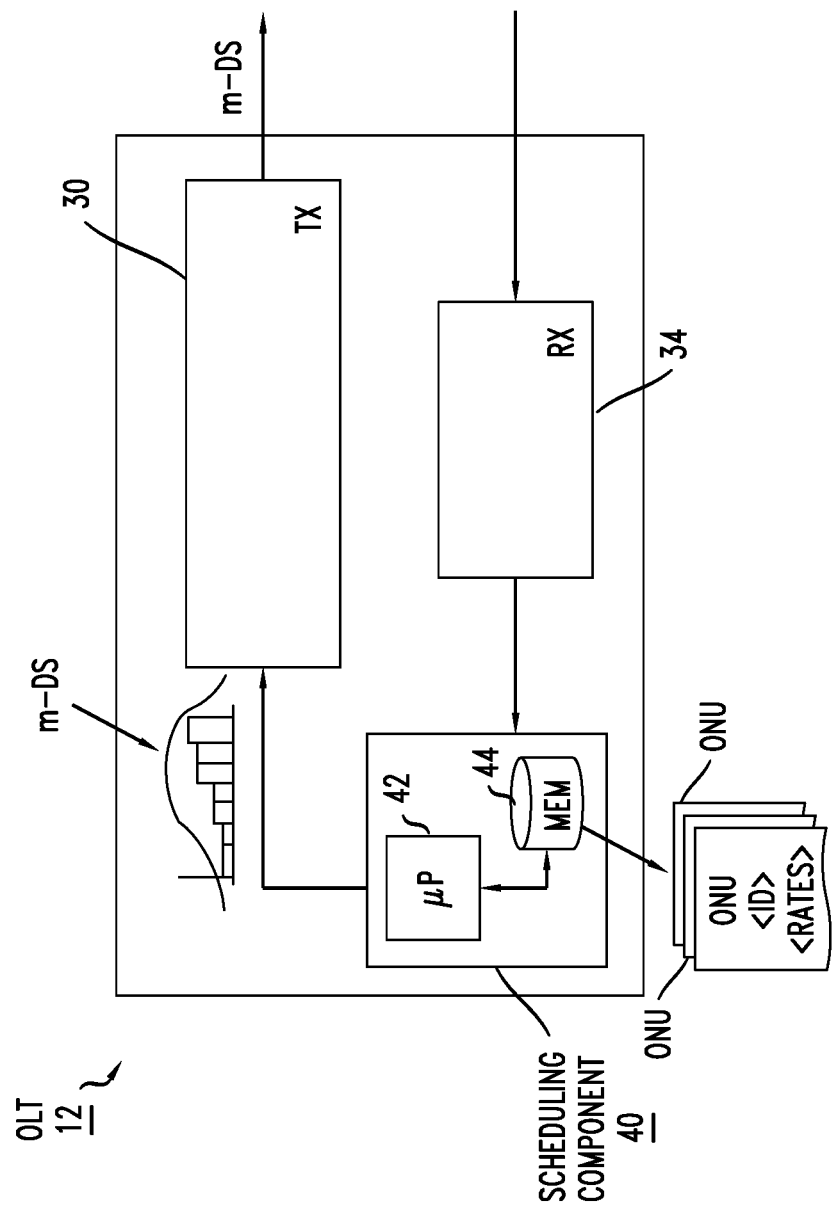
FIG. 8 is a diagram of an exemplary OLT as configured to perform rate-ordered timeslot assignments in accordance with the present invention.

In any of these embodiments, OLT 12 performs the timeslot assignment ordering by virtue of having the specific details of each ONU 14i stored within a memory component resident within OLT 12. An exemplary OLT 12 is shown in FIG. 8 as having a transmit portion 30, a receive portion 34, and a scheduling module 40 (one exemplary type of scheduling module being a media access control (MAC) module as found within a conventional OLT). While a MAC module is typically used to perform functions such as addressing, network processing, traffic management and packet framing, it may be further configured to perform information rate-based timeslot scheduling in accordance with the principles of the present invention. Alternatively, scheduling module 40 may be implemented in the transmission convergence (TC) and/or physical media dependent (PMD) layers of the standard transmission protocols. Regardless of the precise implementation within these layers, the "information rate"-based timeslot assignments as performed in accordance with the principles of the present invention function to minimize the transition in information rates between adjacent user blocks.

Scheduling module 40 is shown in FIG. 8 as including a processor 42 that assigns timeslots for the various user blocks forming the PON frame. A memory element 44 within scheduling module 40 is shown as including a table that pairs the identity of each ONU $14_i$ with both its unique ID and its specific supported downstream information rate. Processor 42 can then construct multi-rate PON frames in accordance with the principles of the present invention by organizing the timeslot assignments for the ONUs according to their information rates (i.e., minimizing transitions by ordering from lowest to highest, or vice versa).

Figure 9:
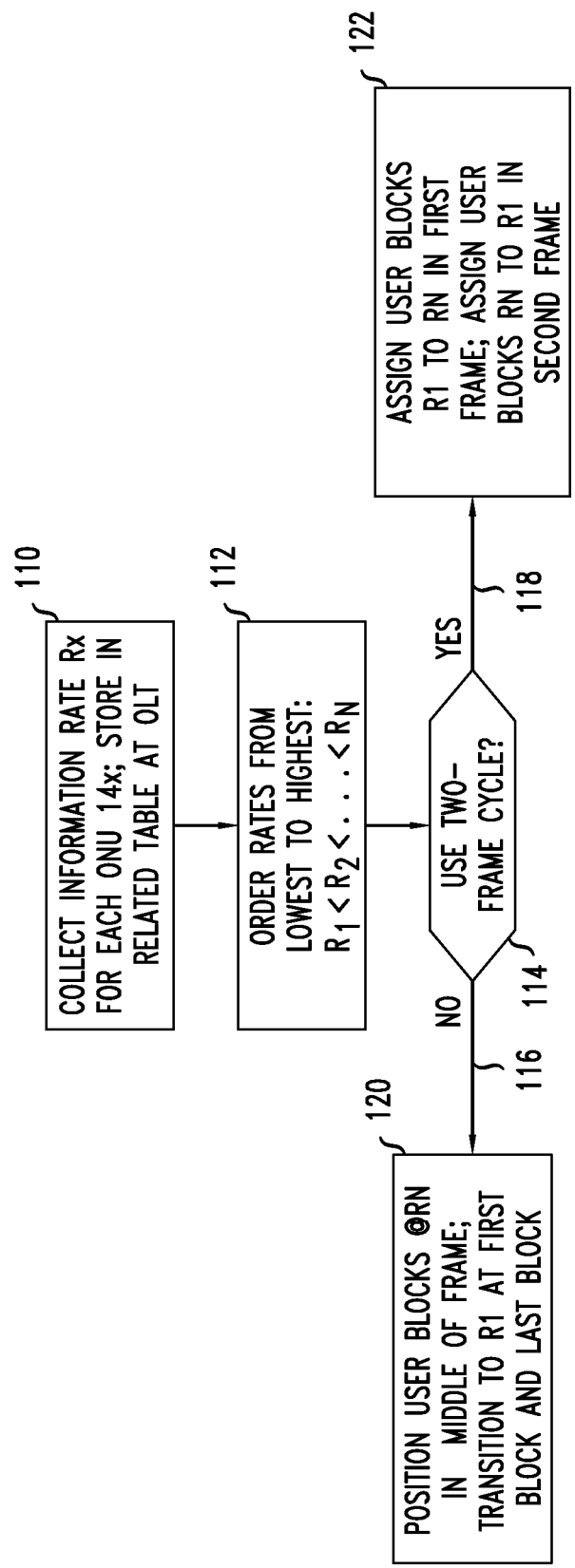
FIG. 9 is a flow chart defining steps that may be performed in implementation of the rate-based timeslot assignments of the present invention.

FIG. 9 illustrates a logic flow diagram of an embodiment of a method 100 for scheduling downstream user blocks in a multi-rate PON environment. In step 110, an identified information rate Rx associated with each ONU 14x is stored in a memory unit. Following that, a rate-based ordering of the set of information rates is performed in step 112 (i.e., $R_1 < R_2 < \ldots < R_N$). In the following decision step 114, a choice of two-part cycle structure is made, either using a single PON frame to support the complete cycle (then continuing along branch 116), or using a pair of adjacent PON frames to support the two-part cycle (continuing along branch 118).

Following branch 116, the actual timeslot assignments proceed in step 120 by having the user blocks (ONUs) operating at the highest rate RN assigned to the timeslots in the middle of the PON frame, with the timeslots on either side then associated with sequentially lower information rates in both directions so that the first timeslot is assigned to a user block operating at rate R1 and, similarly the last timeslot is assigned to another user block also operating at rate R1. With respect to the two-frame scheduling procedure of step 118, timeslot assignment proceeds as shown in step 122 with a first frame having timeslots ordered from R1 to RN, and the second frame having timeslots ordered from RN to R1.

It is to be understood that when building a minimum transition schedule, the arrangement may not be symmetric, depending on the variabilities of the included ONUs, but the transitions between information rates will be minimized.

In accordance with additional embodiments of the present invention, a more gradual transition in the change of clock rate from one block to the next may be provided by intentionally configuring certain coding schemes to operate at line rates between the minimum and maximum values. For example, if various ONUs are able to support high information rate PAM4 traffic and other, legacy ONUs need to maintain the low rate NRZ format, different aspects of the encoding may be used to introduce rates that fall between these two limits (or any other boundary limits). For example, probabilistic constellation shaping may be employed, as well as different forward error correcting (FEC) codes. FEC codes are appended to the data bits to include error correction codes to check the integrity of the received data.

Those skilled in the art to which this application pertains will appreciate that other and further additions, deletions, substitutions and modifications may be made to the described embodiments.

What is claimed is:

1. A method for scheduling user blocks in a downstream data transmission to a plurality of optical network units in a multi-rate time-division-multiplexed (TDM) passive optical network (PON), comprising:
identifying a downstream information rate used by each optical network unit in the plurality of optical network units; and
scheduling timeslots for user blocks based on the identified information rates in a manner that minimizes a transition in information rate between adjacent user blocks, the scheduling utilizing a two-part cycle, with a first part scheduling timeslots from a first information rate to a second information rate and a second, following part scheduling timeslots from the second information rate to the first information rate.

2. The method of claim 1, wherein the scheduling is performed at an optical line terminal, based on downstream information rate values associated with individual ONUs stored in a memory element at the optical line terminal.

3. The method of claim 1, wherein the first information rate is a lowest information rate and the second information rate is a highest information rate.

4. The method of claim 3, wherein the first part schedules user blocks in timeslots within a first PON frame and the second part schedules user blocks in timeslots within a second, adjacent PON frame.

5. The method of claim 3, wherein the first and second parts are both scheduled within a single PON frame.

6. The method of claim 1, wherein the the first information rate is a highest information rate the second information rate is a lowest information rate.

7. The method of claim 6, wherein the first part schedules user blocks in timeslots within a first PON frame and the second part schedules user blocks in timeslots within a second, adjacent PON frame.

8. The method of claim 6, wherein the first and second parts are both scheduled within a single PON frame.

9. The method of claim 1 wherein the two-part cycle performs timeslot assignments across a defined timescale.

10. The method of claim 9 wherein the defined timescale ranges from a fraction of a PON frame to multiple, sequential PON frames.

11. The method of claim 1 wherein the downstream information rates include at least NRZ and PAM4.

12. An apparatus comprising:
at least one processor; and
at least one memory including computer program code, the at least one memory storing, in a paired relationship, an identification of a specific optical network unit (ONU) and its associated downstream information rate for a plurality of ONUs;
the at least one memory and the computer program code configured to, with the at least one processor, cause the apparatus to at least perform scheduling of user blocks in a downstream data transmission to the plurality of ONUs in a multi-rate time-division-multiplexed (TDM) passive optical network (PON) such that the user blocks are scheduled based on the stored information rates in a manner that minimizes a transition in information rate between adjacent user blocks in the downstream data transmission, the scheduling utilizing a two-part cycle, with a first part scheduling timeslots from a first information rate to a second information rate and a second, following part scheduling timeslots from the second information rate to the first information rate.

13. The apparatus of claim 12, wherein the at least one memory and the computer program code are configured to, with the at least one processor cause the apparatus to further perform the user block two-part cycle scheduling where the first information rate is a lowest information rate and the second information rate is a highest information rate.

14. The apparatus of claim 13, wherein the first part schedules user blocks in timeslots within a first PON frame and the second part schedules user blocks in timeslots within a second, adjacent PON frame.

15. The apparatus of claim 13, wherein the first and second parts are both scheduled within a single PON frame.

16. The apparatus of claim 12, wherein the at least one processor and the at least one memory including computer program code are located at an optical line terminal (OLT) of a TDM PON system.

* * * * *